(12) United States Patent
Bank et al.

(10) Patent No.: US 12,542,436 B2
(45) Date of Patent: Feb. 3, 2026

(54) SYSTEM AND METHOD OF FORCASTING THE IMPACT OF DIFFERENT ENERGY TECHNOLOGIES ON POWER CONSUMPTION AND/OR COST

(71) Applicant: Power Triangle Pty Ltd, Cremorne (AU)

(72) Inventors: Jason Bank, Cremorne (AU); Matthew Young, Cremorne (AU)

(73) Assignee: Power Triangle Pty Ltd, Cremorne (AU)

( * ) Notice: Subject to any disclaimer, the term of this patent is extended or adjusted under 35 U.S.C. 154(b) by 382 days.

(21) Appl. No.: 18/035,439

(22) PCT Filed: Nov. 5, 2021

(86) PCT No.: PCT/AU2021/051316
§ 371 (c)(1),
(2) Date: May 4, 2023

(87) PCT Pub. No.: WO2022/094674
PCT Pub. Date: May 12, 2022

(65) Prior Publication Data
US 2023/0402843 A1    Dec. 14, 2023

(30) Foreign Application Priority Data

Nov. 6, 2020 (AU) .................. 2020904062

(51) Int. Cl.
*H02J 3/00* (2006.01)
(52) U.S. Cl.
CPC ........... *H02J 3/003* (2020.01); *H02J 2203/10* (2020.01); *H02J 2203/20* (2020.01)
(58) Field of Classification Search
CPC ..................................... H02J 3/003
See application file for complete search history.

(56) References Cited

U.S. PATENT DOCUMENTS

2010/0138363 A1* 6/2010 Batterberry ............ G06Q 10/04
                                                            700/297
2014/0324737 A1* 10/2014 Palma Serrano ..... H04W 88/08
                                                            705/412

(Continued)

FOREIGN PATENT DOCUMENTS

| KR | 101168153 B1 * | 8/2012 | ............. G06Q 50/06 |
| KR | 20140121521 A * | 10/2014 | ......... G06Q 10/0631 |
| WO | WO-2021108745 A1 * | 6/2021 | ............. G05B 15/02 |

OTHER PUBLICATIONS

Mohammadi et al., Optimal planning of renewable energy resource for a residential house considering economic and reliability criteria, 2017, Department of Renewable Energies and Environment, Faculty of New Sciences and Technologies, University of Tehran, Iran, pp. 261-273 (Year: 2017).*

(Continued)

*Primary Examiner* — Suresh Suryawanshi
(74) *Attorney, Agent, or Firm* — Bochner PLLC; Andrew D. Bochner

(57) ABSTRACT

A method of forecasting the combined impact the introduction of energy technology solutions will have on the energy consumption at a site. The method comprises selecting a plurality of energy technology solutions suitable for use at the site; and generating energy usage data for the site in predetermined time intervals over a predetermined duration. Energy impact data is created for each selected energy technology solution over each predetermined time interval to generate impacted energy data for each selected energy technology solution in a sequential manner. A combined impacted energy data is compared against the energy usage data for the site to determine a forecast combined impact the introduction of the selected energy technology solutions will have on the energy consumption at the site.

17 Claims, 9 Drawing Sheets

(56) References Cited

U.S. PATENT DOCUMENTS

2020/0004908 A1* 1/2020 Hoff ..................... H02S 50/00
2020/0006944 A1* 1/2020 Fife ...................... H02J 3/004

OTHER PUBLICATIONS

Hung, Smart Integration of Distributed Renewable Generation and Battery Energy Storage, 2014, The School of Information Technology and Electrical Engineering (The University of Queensland), pp. 1-187 (Year: 2014).*

* cited by examiner

| Technology | Data Backbone Position | Technology Can Generate kWh's | Project Option Status | Export Limit | Export Limit (kVA) | Generator Limit | Generator Limit (kVA) | Generator Limit (pf) |
|---|---|---|---|---|---|---|---|---|
| LED LIGHTING | 1 | NO | ENABL | NO | 0 | NO | | |
| VOLTAGE OPTIMISATION | 2 | NO | ENABL | NO | 0 | NO | | |
| MONITORING | 3 | NO | ENABL | NO | 0 | NO | | |
| POWER FACTOR CORRECTION | 4 | NO | DISAB | NO | 0 | NO | | |
| SOLAR POWER | 5 | YES | DISAB | YES | 0 | NO | | |
| BATTERY ENERGY STORAGE | 6 | YES | DISAB | YES | 0 | NO | | |

FIG. 4

Site Now  
Position 0  
Hourly Intervals 4

| Read Date & Start Time | Read Date & Finish Time | kWh's Import To Site Net | kVARh's Import To Site Net | kVA | pf |
|---|---|---|---|---|---|
| 12:00:00 AM | 12:15:00 AM | 50.0 | 0.0 | 200 | 1.00 |
| 12:15:00 AM | 12:30:00 AM | 50.0 | 5.0 | 201 | 1.00 |
| 12:30:00 AM | 12:45:00 AM | 50.0 | 50.0 | 283 | 0.71 |
| 12:45:00 AM | 1:00:00 AM | 50.0 | 60.0 | 312 | 0.64 |
| 1:00:00 AM | 1:15:00 AM | 50.0 | 45.0 | 269 | 0.74 |
| 1:15:00 AM | 1:30:00 AM | 50.0 | 45.0 | 269 | 0.74 |
| 1:30:00 AM | 1:45:00 AM | 50.0 | 45.0 | 269 | 0.74 |
| 1:45:00 AM | 2:00:00 AM | 50.0 | 45.0 | 269 | 0.74 |
| 2:00:00 AM | 2:15:00 AM | 50.0 | 45.0 | 269 | 0.74 |
| 2:15:00 AM | 2:30:00 AM | 50.0 | 45.0 | 269 | 0.74 |
| 2:30:00 AM | 2:45:00 AM | 50.0 | 45.0 | 269 | 0.74 |
| 2:45:00 AM | 3:00:00 AM | 50.0 | 45.0 | 269 | 0.74 |
| 3:00:00 AM | 3:15:00 AM | 50.0 | 45.0 | 269 | 0.74 |
| 3:15:00 AM | 3:30:00 AM | 50.0 | 45.0 | 269 | 0.74 |
| 3:30:00 AM | 3:45:00 AM | 50.0 | 45.0 | 269 | 0.74 |
| 3:45:00 AM | 4:00:00 AM | 50.0 | 45.0 | 269 | 0.74 |
| 4:00:00 AM | 4:15:00 AM | 50.0 | 45.0 | 269 | 0.74 |
| 4:15:00 AM | 4:30:00 AM | 20.0 | 5.0 | 82 | 0.97 |

FIG. 5

| TECH IMPACT POST QA CONTROLS | |
|---|---|
| Pre Safety Check, kWh's Import To Site Net | Pre Safety Check, kVARh's Import To Site Net |
| -75.0 | 0.0 |
| -50.0 | 0.0 |
| -30.0 | 0.0 |
| -51.0 | 0.0 |
| -8.1 | -3.3 |
| -7.7 | -3.1 |
| -7.4 | -2.9 |
| -7.0 | -2.8 |
| -6.6 | -2.7 |
| -6.3 | -2.5 |
| -6.0 | -2.4 |
| -6.3 | -2.5 |
| -6.6 | -2.6 |
| -6.9 | -2.8 |
| -7.3 | -2.9 |
| -7.6 | -3.1 |
| -8.0 | -3.2 |
| -5.0 | -3.0 |

Table 54:

| Read Date & Start Time | Read Date & Finish Time | kWh's Import to Site Net | kVARh's Import to Site Net | kVA | pf |
|---|---|---|---|---|---|
| 12:00:00 AM | 12:15:00 AM | 50.0 | 0.0 | 200 | 1.00 |
| 12:15:00 AM | 12:30:00 AM | 50.0 | 5.0 | 201 | 1.00 |
| 12:30:00 AM | 12:45:00 AM | 50.0 | 50.0 | 283 | 0.71 |
| 12:45:00 AM | 1:00:00 AM | 50.0 | 60.0 | 312 | 0.64 |
| 1:00:00 AM | 1:15:00 AM | 50.0 | 45.0 | 269 | 0.74 |
| 1:15:00 AM | 1:30:00 AM | 50.0 | 45.0 | 269 | 0.74 |
| 1:30:00 AM | 1:45:00 AM | 50.0 | 45.0 | 269 | 0.74 |
| 1:45:00 AM | 2:00:00 AM | 50.0 | 45.0 | 269 | 0.74 |
| 2:00:00 AM | 2:15:00 AM | 50.0 | 45.0 | 269 | 0.74 |
| 2:15:00 AM | 2:30:00 AM | 50.0 | 45.0 | 269 | 0.74 |
| 2:30:00 AM | 2:45:00 AM | 50.0 | 45.0 | 269 | 0.74 |
| 2:45:00 AM | 3:00:00 AM | 50.0 | 45.0 | 269 | 0.74 |
| 3:00:00 AM | 3:15:00 AM | 50.0 | 45.0 | 269 | 0.74 |
| 3:15:00 AM | 3:30:00 AM | 50.0 | 45.0 | 269 | 0.74 |
| 3:30:00 AM | 3:45:00 AM | 50.0 | 45.0 | 269 | 0.74 |
| 3:45:00 AM | 4:00:00 AM | 50.0 | 45.0 | 269 | 0.74 |
| 4:00:00 AM | 4:15:00 AM | 50.0 | 45.0 | 269 | 0.74 |
| 4:15:00 AM | 4:30:00 AM | 20.0 | 5.0 | 82 | 0.97 |

+

Table 60a — TECH IMPACT POST QA CONTROLS:

| Pre Safety Check, kWh Import to Site Net | Pre Safety Check, kVARh's Import To Site |
|---|---|
| -75.0 | 0.0 |
| -50.0 | 0.0 |
| -30.0 | 0.0 |
| -51.0 | 0.0 |
| -8.1 | -3.3 |
| -7.7 | -3.1 |
| -7.4 | -2.9 |
| -7.0 | -2.8 |
| -6.6 | -2.7 |
| -6.3 | -2.5 |
| -6.0 | -2.4 |
| -6.3 | -2.5 |
| -6.6 | -2.6 |
| -6.9 | -2.8 |
| -7.3 | -2.9 |
| -7.6 | -3.1 |
| -8.0 | -3.2 |
| -5.0 | -3.0 |

=

Table 63a — TECH RESULT POST QA CONTROLS:

| kWh's Import To Site Net | kVARh's Import To Site Net | kVA | pf |
|---|---|---|---|
| -25.0 | 0.0 | 100 | -1.00 |
| 0.0 | 5.0 | 20 | 0.00 |
| 20.0 | 50.0 | 215 | 0.37 |
| -1.0 | 60.0 | 240 | -0.02 |
| 41.9 | 41.7 | 236 | 0.71 |
| 42.3 | 41.9 | 238 | 0.71 |
| 42.6 | 42.1 | 240 | 0.71 |
| 43.0 | 42.2 | 241 | 0.72 |
| 43.4 | 42.3 | 242 | 0.72 |
| 43.7 | 42.5 | 244 | 0.72 |
| 44.0 | 42.6 | 245 | 0.72 |
| 43.7 | 42.5 | 244 | 0.72 |
| 43.4 | 42.4 | 243 | 0.72 |
| 43.1 | 42.2 | 241 | 0.71 |
| 42.7 | 42.1 | 240 | 0.71 |
| 42.4 | 41.9 | 238 | 0.71 |
| 42.0 | 41.8 | 237 | 0.71 |
| 15.0 | 2.0 | 61 | 0.99 |

| 63a TECH RESULT POST QA CONTROLS | | | | | 60b TECH IMPACT POST QA CONTROLS | | | 63b TECH RESULT POST QA CONTROLS | | | |
|---|---|---|---|---|---|---|---|---|---|---|---|
| kWh's Import To Site Net | kVARh's Import To Site Net | kVA | pf | | Pre Safety Check, kWh Import To Site Net | Pre Safety Check, kVARh's Import To Site | | kWh's Import To Site Net | kVARh's Import To Site Net | kVA | pf |
| -25.0 | 0.0 | 100 | -1.00 | | 0.0 | 0.0 | | -25.0 | 0.0 | 100 | -1.00 |
| 0.0 | 5.0 | 20 | 0.00 | | 0.0 | 0.0 | | 0.0 | 5.0 | 20 | 0.00 |
| 20.0 | 50.0 | 215 | 0.37 | | -2.3 | -5.8 | | 17.7 | 44.2 | 190 | 0.37 |
| -1.0 | 60.0 | 240 | -0.02 | | 0.0 | 0.0 | | -1.0 | 60.0 | 240 | -0.02 |
| 41.9 | 41.7 | 236 | 0.71 | | -4.9 | -4.8 | | 37.0 | 36.9 | 209 | 0.71 |
| 42.3 | 41.9 | 238 | 0.71 | | -4.9 | -4.9 | | 37.4 | 37.0 | 210 | 0.71 |
| 42.6 | 42.1 | 240 | 0.71 | | -4.9 | -4.9 | | 37.7 | 37.2 | 212 | 0.71 |
| 43.0 | 42.2 | 241 | 0.71 | | -5.0 | -4.9 | | 38.0 | 37.3 | 213 | 0.71 |
| 43.4 | 42.3 | 242 | 0.72 | | -5.0 | -4.9 | | 38.3 | 37.4 | 214 | 0.72 |
| 43.7 | 42.5 | 244 | 0.72 | | -5.1 | -4.9 | | 38.6 | 37.6 | 215 | 0.72 |
| 44.0 | 42.6 | 245 | 0.72 | | -5.1 | -4.9 | | 38.9 | 37.7 | 217 | 0.72 |
| 43.7 | 42.5 | 244 | 0.72 | | -5.1 | -4.9 | | 38.6 | 37.6 | 216 | 0.72 |
| 43.4 | 42.4 | 243 | 0.72 | | -5.0 | -4.9 | | 38.4 | 37.4 | 214 | 0.72 |
| 43.1 | 42.2 | 241 | 0.71 | | -5.0 | -4.9 | | 38.1 | 37.3 | 213 | 0.71 |
| 42.7 | 42.1 | 240 | 0.71 | | -5.0 | -4.9 | | 37.8 | 37.2 | 212 | 0.71 |
| 42.4 | 41.9 | 238 | 0.71 | | -4.9 | -4.9 | | 37.4 | 37.1 | 211 | 0.71 |
| 42.0 | 41.8 | 237 | 0.71 | | -4.9 | -4.8 | | 37.1 | 36.9 | 209 | 0.71 |
| 15.0 | 2.0 | 61 | 0.99 | | -1.7 | -0.2 | | 13.3 | 1.8 | 54 | 0.99 |

SYSTEM AND METHOD OF FORCASTING THE IMPACT OF DIFFERENT ENERGY TECHNOLOGIES ON POWER CONSUMPTION AND/OR COST

RELATED APPLICATIONS

The present application claims priority from Australian Provisional Patent Application No. 2020904062 filed on 6 Nov. 2020, the entire contents of which are incorporated herein by reference.

FIELD OF INVENTION

The present invention relates generally to a system and method of forecasting energy consumption and demand for energy consumers, and in particular, to a system and method of forecasting the impact of employing a mix of energy technologies within an energy consumption system to provide the best return on investment and greatest reduction in energy consumption costs for consumers.

BACKGROUND OF THE INVENTION

In modern society, the need to have ready access to a reliable and cost effective supply of energy is a fundamental requirement of most residential and commercial consumers. As society becomes more and more dependent on energy availability and as traditional energy supply resources, such as fossil fuels, are becoming less abundant and less attractive to consumers due to environmental concerns, the costs associated with energy supply and consumption have risen considerably.

As a direct result of this, a variety of alternative energy solutions have been proposed to promote a more flexible energy supply and a more efficient use of energy at the consumer end. Such solutions include technology that improves a consumer's efficient use of energy, such as employing LED lighting, voltage optimisation schemes, energy monitoring systems, power factor correction and HVAC upgrades. Renewable energy technologies, such as solar, wind and tidal energy harnessing systems are also becoming more frequently available to provide consumers with supply solutions that do not rely on fossil fuels. Similarly, dispatchable energy technologies have been developed to provide consumers with an on-demand power supply that can be turned on/off or have their power output adjusted according to the consumer's needs. These dispatchable energy sources include battery energy storage systems and generators which can be employed by the end consumer to satisfy their ongoing energy requirements.

Despite the on-going increase in the number of technologies available to energy consumers and the numerous possibilities for consumers to improve their energy consumption, it has proven difficult to forecast the optimum manner in which such technologies can be combined in a residential or commercial application. Thus, whilst some solutions claim to offer some benefits to the consumer and a significant energy bill reduction, when that solution is combined with one or more other solutions, it becomes difficult to determine the combined benefit expected.

In the present market, this problem has been addressed by merely considering the impact one technological solution may have on the energy consumption at a site and simply adding that benefit to the benefits that other technological solutions may provide. However, in practice, the combined benefits are not simply additive as the technologies are typically interdependent upon each other and the historical or forecasted energy usage of the consumer. Thus, existing methodologies for calculating and forecasting energy savings have proven to be very inaccurate, thereby underplaying the importance of such technologies in minimising energy usage and delaying their uptake and acceptance in the market.

Thus, there is a need to provide a system that accurately forecast the combined impact of different electrical energy technology solutions deployed together in a consumer environment.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a method of forecasting the combined impact the introduction of energy technology solutions will have on the energy consumption at a site, comprising:

selecting a plurality of energy technology solutions suitable for use at the site;

generating energy usage data for the site, the energy usage data comprising data usage for the site in predetermined time intervals over a predetermined duration;

creating energy impact data for each selected energy technology solution for each predetermined time interval based on the energy usage data for that time interval;

sequentially generating impacted energy data for each selected energy technology solution across each time interval, the impacted energy data generated for a preceding energy technology solution being used to generate the impacted energy data for a subsequent energy technology solution;

following completion of the sequentially generated impacted energy data for each energy technology solution, summing for each time interval independently the impacted energy data to generate a combined impacted energy data over the predetermined duration; and comparing the combined impacted energy data against the energy usage data for the site to determine a forecast combined impact the introduction of the selected energy technology solutions will have on the energy consumption at the site.

In one embodiment, the plurality of energy technology solutions are selected from a table that lists each energy technology solution applicable for implementation at the site. An energy technology solution may comprise a group of energy technology solutions that share electrical characteristics. The energy technology solutions may be selected from the group of LED Lighting systems; Voltage Optimisation systems; Energy Monitoring systems; Power Factor Correction systems; Solar Power generators; Battery Energy Storage systems; Peak Lopping dispatchable generators; and HVAC upgrade systems.

In one embodiment, the energy usage data for the site may be generated from historical energy use for the site over the predetermined duration.

In another embodiment, the energy usage data for the site may be generated from projected energy usage data for the site.

The energy usage data for the site may contain active or real power imported into or exported from the site for the predetermined time intervals as well as reactive power imported into or exported from the site for the predetermined time intervals. An apparent power value and a power factor value can be determined from the active or real power data and the reactive power data. The apparent power value and the power factor value may be determined for each of the predetermined time intervals.

The energy impact data for each selected energy technology solution may be created for each predetermined time interval in terms of real or active power and reactive power. The energy impact data may be generated in a table for each energy technology solution calculating an impact the energy technology solution will have on energy usage for each predetermined time period in terms of real or active power and reactive power.

The impacted energy data may be sequentially generated for each selected energy technology solution by firstly generating impact table data for a first energy technology solution based on the site energy usage data to create the impacted energy data for the first energy technology solution and then using the impacted energy data for the first energy technology solution as a basis for generating an impacted energy data for a second energy technology solution.

An impact for each time period on the active power requirements and the reactive power requirements for each energy technology solution may be added to the imported/exported active power data and reactive power data for that time period to generate a technology result table specific for the impact that technology has on the active and reactive power requirements for the site.

The technology result table generated from the impact of the previous energy technology solution may be used as a starting point for generating a technology result table for a subsequent energy technology solution.

The combined impacted energy data over the predetermined duration may be generated by summing each of the real and reactive power data generated for each of the time intervals present in the final technology result table for the last energy technology solution in the sequence.

The step of comparing the combined impact energy data against the energy usage data may comprise creating a forecast energy bill for determining a cost saving in energy against a cost for implementing the energy technology solutions.

The forecast energy bill may take into consideration energy tariffs associated with implementing the selected energy technology solutions.

BRIEF DESCRIPTION OF THE DRAWINGS

The invention may be better understood from the following non-limiting description of preferred embodiments, in which:

FIG. 4 is a table depicting how energy solution technologies can be selected in accordance with an embodiment of the present invention;

FIG. 5 is a table depicting the manner in which the historical energy usage data is collected in accordance with an embodiment of the present invention;

FIG. 6 is a table depicting the manner in which the energy impact data is created for each energy technology solution in accordance with an embodiment of the present invention;

FIG. 7 depicts the manner in which the impacted energy data is generated for an energy technology solution in accordance with an embodiment of the present invention;

FIGS. 8 and 9 depict the manner in which the impacted energy data is sequentially generated for each of the energy technology solutions selected for assessment by the user, in accordance with an embodiment of the present invention;

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to a method for forecasting the combined impact of different electrical energy technology solutions deployed together on the energy consumption of an energy consumer or energy consumption system. The present invention can be used by end consumers to determine the best combination of technologies to be employed at their site and to provide an accurate forecast of the amount of energy and bill reduction they can expect to achieve and thus the likely return on their investment for investing in such technologies. Whilst the present invention will be described below in relation to sites that are connected to the electricity grid, it will be appreciated that the same principles of application can be applied to sites connected to the gas grid or a combination of the electricity and gas grid.

As new technological developments become realised, there is a constant growth in the variety of technologies that can be used with existing energy systems to minimise consumption whilst ensuring sufficient energy is available to operate a site. These technologies include:

LED Lighting (energy efficiency)
Voltage Optimisation (energy efficiency)
Energy Monitoring (energy efficiency)
Power Factor Correction (energy efficiency)
Solar Power (renewable energy)
Battery Energy Storage (dispatchable energy & load)
Peak Lopping dispatchable generators (dispatchable energy)
HVAC upgrades (energy efficiency)

It will be appreciated that the above list of technologies is not exhaustive and is merely illustrative of the type of technologies that are suitable for assessment with the present invention. In this regard, any available energy technology is able to be used with the system and method of the present invention and as new technologies develop and evolve they can be simply incorporated into the present invention to assist in identifying an optimised energy solution for consumers.

Whilst any one or more of the above technologies can be employed at an energy consumption site, such as a commercial or residential building or complex, there is no means available to accurately forecast the combined impact the various technologies will have on a site's energy consumption, particularly in relation to expected bill reduction and a return on investment associated with adopting such technologies.

Figure 1:
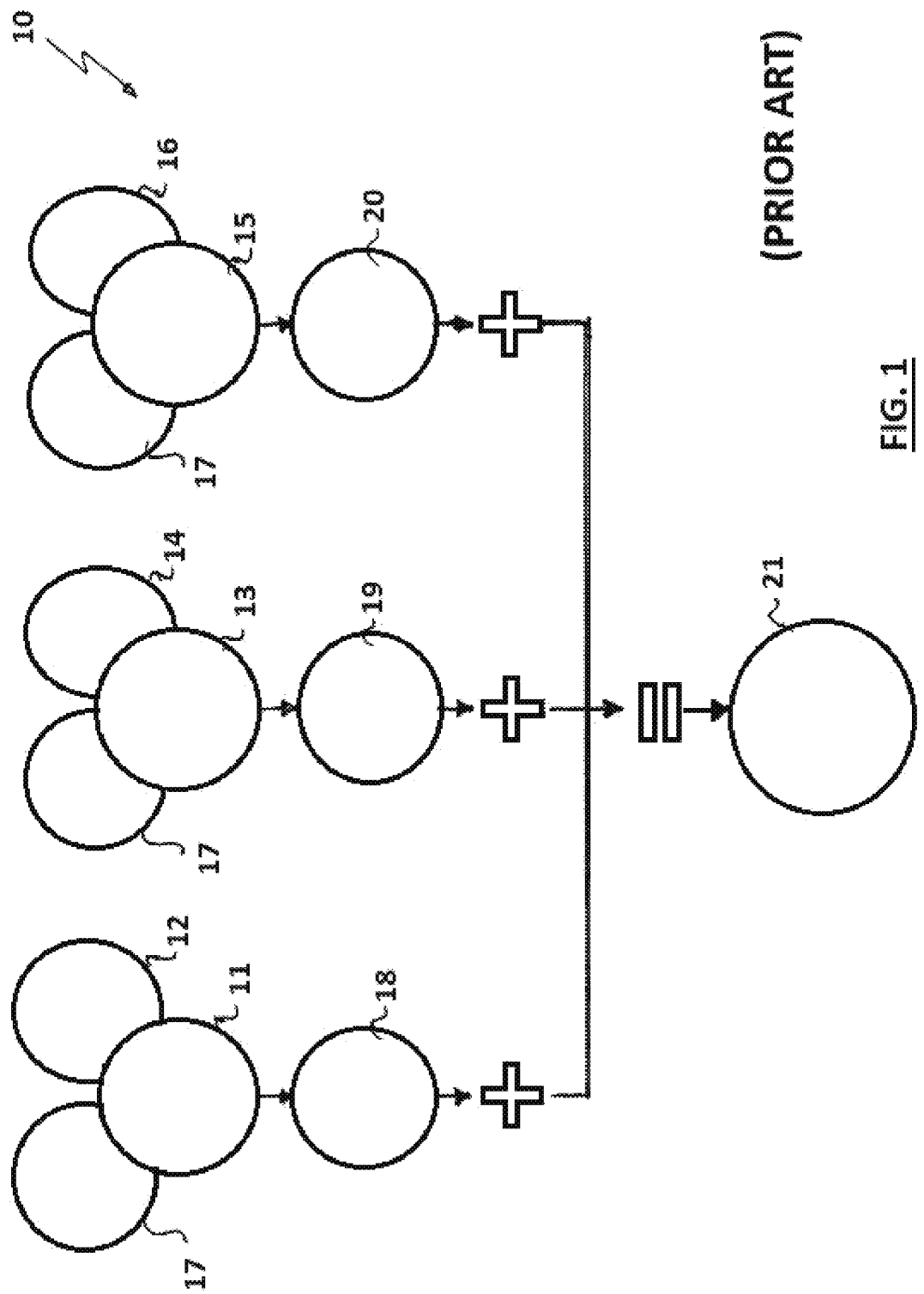
FIG. 1 is a functional diagram of a conventional system for assessing the impact of energy solution technologies on the energy consumption at a site in accordance with the prior art.

FIG. 1 depicts a conventional prior art system 10 that has typically been used to forecast an impact that the introduction of different technologies 12, 14, and 16 will have on the energy consumption at a site, such as a residential or commercial site. It will be appreciated that the number of technologies to be considered for introduction at a site can vary, depending upon the site. In the present example only three technologies 12, 14 and 16 are being considered. The technologies 12, 14 and 16 may include the introduction of any of the technologies listed above that may be under consideration for implementation at the site, as well as any other technologies that may be available, or may become available, in the future. The traditional forecasting system 10 will typically individually assess the specific technology 12, 14 or 16 against energy use data 17 generated for the site, which may be based on historical site energy use data or forecasted use requirements for the site. A simple analysis engine 11, 13, 15 takes the energy use data 17 for the site and assess the impact the specific technology 12, 14 or 16 will have on the site's energy consumption. The relevant analysis engine 11, 13, 15 will then generate revised energy usage impact data 18, 19, 20 for each specific technology. For example, if technology 12 is the introduction LED lighting in the office or factory, the analysis engine 11 will use the historical energy usage information 17, such as running time and number of lights to be used, to generate a revised energy usage impact data 18 for replacing all or some of the existing lighting with LED lighting.

The same process is performed for each of the other technologies 14 and 16 to generate revised energy usage impact data 19, 20 likely to be achieved with the introduction of the new technology. In order to assess the overall impact that the combined introduction of each of the technologies will have on the site, the individually generated revised energy usage impact data FIGS. 18, 19, 20 are added together to provide a total impact figure which is taken away from the original energy usage data 17 to provide a combined forecast consumption data 21. This combined forecast consumption data 21 can then be used by appropriate managers of the site to determine the overall impact the new technologies will have on energy consumption at the site to minimise energy bills and to validate investment in introducing such new technologies.

However, it has been found that in order to provide for an accurate forecast of the impact of combined technologies on a site, the individual technologies need to be assessed not just in relation to their individual impact on energy consumption, but also on their interdependencies with not just one another, but also on the energy usage data 17 for the site.

Referring to FIG. 1, a problem with such a conventional forecasting system 10 can be explained in the specific situation as follows. In an example, the system 10 may be used in relation to a site whereby the energy usage data 17 for the site, at any point in time, is 100 kW of electrical energy. The site manager may be seeking to install technologies such as LED lighting technology 12, a voltage optimisation unit 14 and solar power installation 16 in an attempt to minimise power consumption on site. In the present example, the solar power installation 16 is not able to export and excess energy from the site.

As discussed above, each analysis engine 11, 13 and 15 determines, based on the energy usage data 17 for the site, that the energy usage impact data 18 for LED lighting is −50 kW (a saving of 50 kW); the energy usage impact data 19 for the voltage optimisation unit 14 is −10 kW (a 10% reduction of power or a saving of and the energy usage impact data 20 for the solar power system is −60 kW (or a saving of 60 kW). Thus, using a conventional approach to forecasting the combined forecast consumption data 21 of the technologies 12, 14, 16, the individual impacts 18, 19 and 20 are added together to provide an overall impact of −120 kW, namely an overall reduction in consumption of 120 kW, based on the energy usage data 17 for the site using 100 kW of electrical energy. In this regard, the combined forecast impact 21 is −20 kW.

Clearly, there are a number of inconsistencies or impossibilities with such a forecast impact 21. In reality, the installation of the voltage optimisation unit 14 will save 10% of power which is interdependent on each of the other technologies. As such, by calculating the impact 19 of 10 kW in isolation, an inaccurate result occurs as this merely assesses the technology against the site's energy usage data 17 and not the overall impact when mixed with each of the other technologies being considered. Similarly, as the solar power installation 16 is not able to export power from the site, it cannot support an end forecast impact 21 that is negative. Whilst the individual impact 20 for the solar power installation 16 is correct and does not generate a negative result (i.e. 100 kW-60 kW=40 kW), when the impact is added to the impacts 18 and 19 of the other technologies the result is incorrect and not possible. It will be appreciated that by using such a conventional approach to forecast technology impact, the forecast results make it very difficult to accurately forecast the impact of installing different technologies at a site, which can be a deterrent to the uptake of new technologies in existing site installations.

For this reason, the system of the present invention has been proposed to provide a more accurate forecasting system that can analyse the impact of new technologies on each other in light of historical site usage data and/or estimated site usage data.

Figure 2:
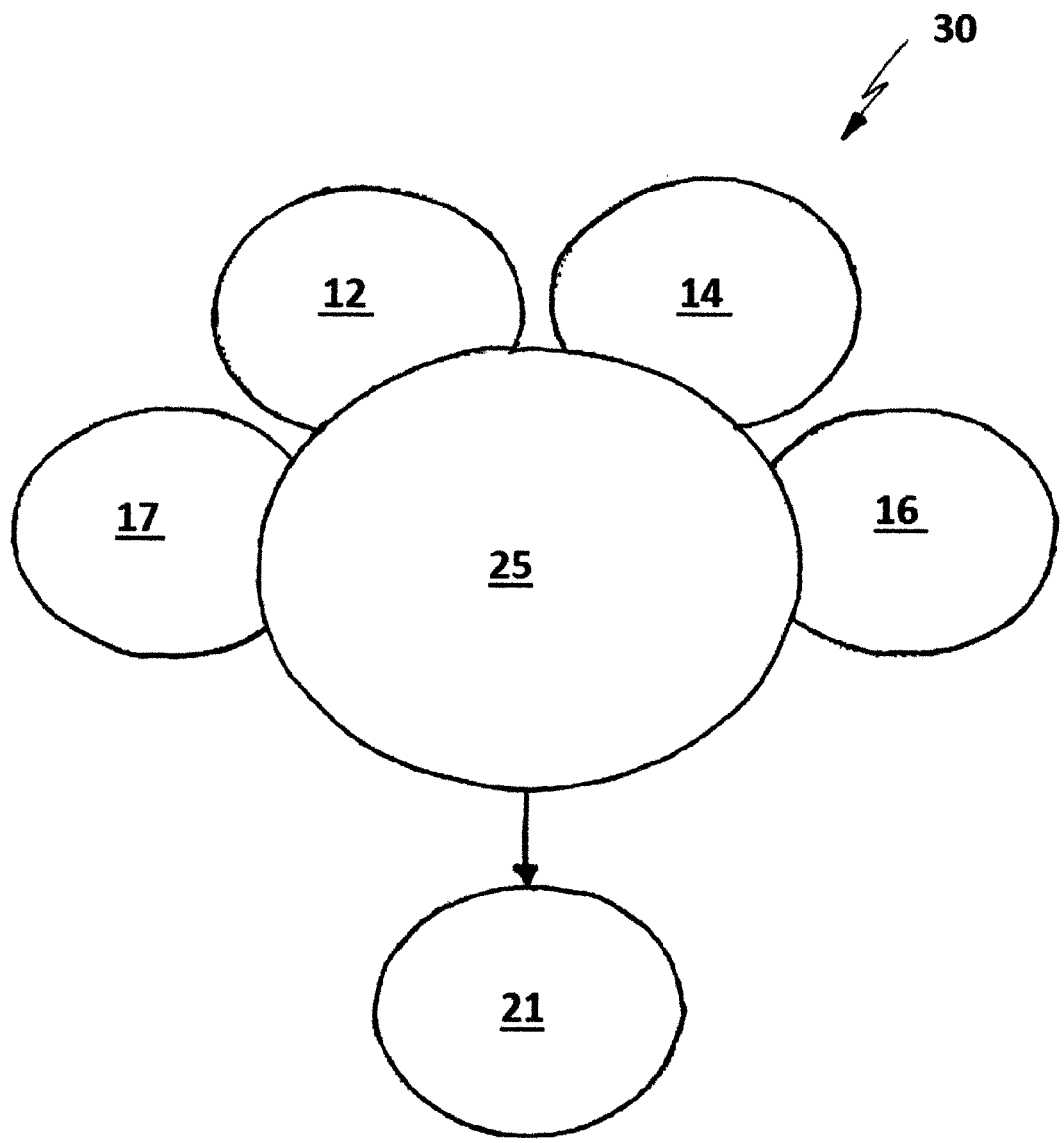
FIG. 2 is a functional diagram of a system for assessing the impact of energy solution technologies on the energy consumption at a site in accordance with an embodiment of the present invention.

One embodiment of the present invention is depicted as system 30 in FIG. 2. In this system 30, the effect of implementing new technologies at a site can be simply and effectively forecast in a manner that caters for the interdependencies of each technology in association with the site's energy usage data 17. It will be appreciated that the site's energy usage data 17 may be based on the site's historical energy use or consumption or may be estimated data based on proposed or desired energy use or consumption at the site.

As shown, the system 30 is characterised by the processing engine 25 which takes, as inputs, the site energy usage data 17 and data associated with each technology 12, 14 and 16 that the site is seeking to implement as part of the energy management system. Whilst the system 30 is depicted as seeking to implement three different technology solutions 12, 14 and 16, the total number of technology solutions that may be considered with the present system 30 is limitless, depending on the number of technology solutions available. The processing engine 25 is able to be employed to provide an accurate forecast of the combined impact of each technology selected for use at the site. As will be discussed in more detail below, the processing engine 25 enables different combinations of technologies 12, 14 and 16 to be selected for implementation at the site to provide an accurate forecast of the combined impact the technologies will have on energy consumption for that site.

The processing engine 25 is configured to process the energy usage data 17 for the site in discrete time series intervals. There is no limit to the time intervals the processing engine can process along with their duration. For example, the processing engine can process one second through to hourly intervals over a duration of 1 day through to 100 years (and wider ranges still). In a preferred embodiment of the system 30 to be described below, the processing engine 25 will be depicted as processing energy usage data in 15 minute intervals in order to generate an impact forecast for the subsequent year of the same granularity.

Figure 3:
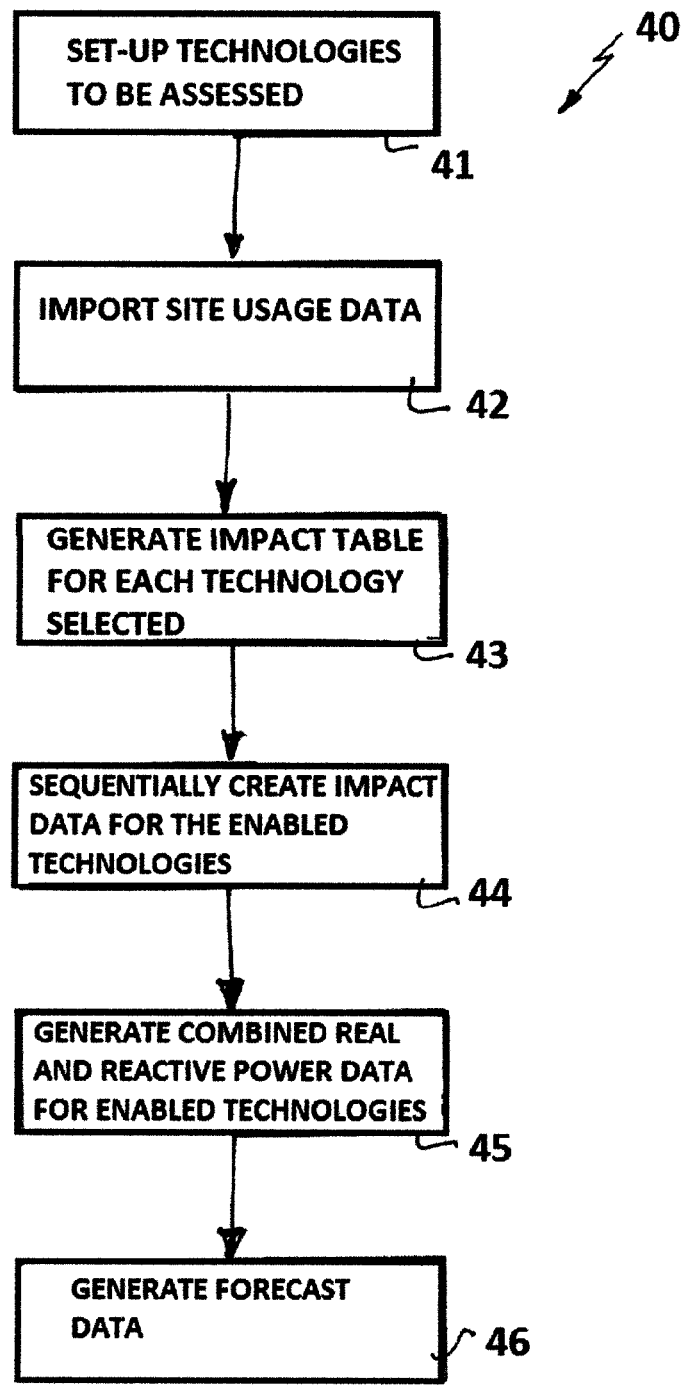
FIG. 3 is a flow chart depicting a method for assessing the impact of energy solution technologies on the energy consumption at a site in accordance with an embodiment of the present invention.

The process engine 25 functions in accordance with the method 40 as depicted in FIG. 3.

In an embodiment of the present invention, the process engine 25 will be a part of a software configured application that is operated on a standard computer or similar electronic device. In one embodiment, the software may operate on-line using an event driven, server-less computing platform that runs code in response to events and automatically manages the computing resources required by that code, such as AWS Lambda, developed by Amazon.com.

In another embodiment, the computer may include a central processing unit or CPU that includes one or more microprocessors and memory operably connected to the CPU. The memory can include any combination of random access memory (RAM), a storage medium such as a magnetic hard disk drives(s) and the like. The storage medium can be used for long term storage of historical energy usage data for a site as well as past forecasting results. The central processing unit, which is associated with random access memory, is used for containing program instructions and transient data related to the system 30. In particular, the memory may contain a body of instructions for implementing the method 40 of the present invention. The process engine 25 may be remotely hosted or accessible via the cloud or similar hosting service.

In a preferred embodiment, the system 30 may be remotely accessible by the internet or a dedicated mobile or cellular network in combination with the internet, such as a GSM, CDMA, UTMS, WCDMA or LTE networks and the like. Other types of networks such as an intranet, an extranet, a virtual private network (VPN) and non-TCP/IP based networks are also envisaged.

Users of the system 30 may be provided with a dedicated software application which is operated by the CPU stored in a remote host server. A copy of the software application may be obtained by a user by downloading it directly to their personal computer or electronic device such that, once installed, the software application of the host service provides an interface that enables the user to facilitate communication of information to the host service, to perform the forecasting process. In another embodiment, the software application may be remotely hosted.

The method 40 comprises a first step 41 whereby the user is able to set up the number and combination of technologies they would like to trial for their site. As is depicted in FIG. 4, the user may be presented with a table 50 listing each potential technology 51 that may be selected by the user. In the embodiment as depicted in FIG. 4, there are six technology options 51 available for selection by the user. However, it will be appreciated that the number of technology options 51 available for selection may vary and may be added to or removed from the table 50 as new technologies and options become available and/or old ones become irrelevant or obsolete.

The user can determine which of the technology options 51 they wish to enable and disable and for those technologies capable of generating and exporting power back into the grid, such as solar power generators, an export limit 52 can be set together with a generator limit 53. This can then enable the system 30 to perform a forecast operation based on the enabled technologies 51 and the combined impact those technologies will have on the power consumption of the site.

It will be appreciated that for technologies that have similar electrical characteristics, such technologies can be grouped and viewed as a single technology within the present invention as described as follows. In this regard, to cover such instances any reference to a "technology" or a "technology solution" may refer to one type of technology or a group of technologies having similar electrical characteristics.

In step 42, the site's energy usage data is imported into the system 30. As is depicted in FIG. 5, this information is provided in the form of table 54 which is broken into specific time intervals 55 over a predetermined duration. In the embodiment as depicted, the information is broken into 15 minute time intervals over a duration of 270 minutes. However, it will be appreciated that the time intervals and duration of the energy usage can vary. For forecasting an impact over a duration of typically 1 year, 35,040 lines of data covering 15 minute intervals are imported into the system. As discussed previously, this site energy usage data may be based on historical energy use over the time intervals, or may be generated or projected energy usage data for the site based on an understanding of energy requirements for that site.

The energy usage data for the site typically contains the active or real power 56 in kWh's imported into the site (exported power is shown as a negative value) for the time interval as well as reactive power 57 in KVARh's imported into the site (again, exported power is shown as a negative value). Based on this data, the apparent power 58 in kVA's and a power factor 59 is calculated in accordance with the following formula:

$$\text{apparent power (58) (kVA)} = \sqrt{(\text{real power kWh's (56)})^2 + (\text{reactive power kVARh's (57)})^2} \times \text{hourly intervals}$$

$$\text{real power (kW)} = \text{kWhs import to site (56)} \times \text{hourly intervals}$$

$$\text{Power factor} = \frac{\text{real power (kW)}}{\text{apparent power (kVA)}}$$

This information is calculated for each time interval to generate the table as depicted in FIG. 5.

It will be appreciated that whilst the present embodiment will be described below using the terms kWh's and kVARh's expressed as 'Nett' values, in other embodiments of the present invention, kWh's and kVARh's may be expressed as gross values and import and export values of these terms may be located within separate columns for each metric.

In step 43, an impact table 60 is imported for each technology based on the energy usage data generated in step 42 for each time interval 55. An example of an impact table 60 generated for a specific technology, such as a battery energy storage system, is depicted in FIG. 6. The impact table 60 comprises, for each interval 55, the impact the technology will have on that time interval in terms of real or active power (kWh) 61 and reactive power (kVARh) 62. A similar table will be generated for all activated technologies selected by the user in step 41, which will be referred to as 60a, 60b, 60c . . . .

In step 44, and as depicted in FIG. 7, a result table 63a is initially generated for the first selected technology based on the impact table data 60a for that technology when compared to the site energy usage data 54 imported in step 42 and depicted in FIG. 5. In this regard, the impact for each time period on the active power requirements for that technology in kWh and the reactive power requirements in kVARh are added to the imported/exported active power data and reactive power data for that time period to generate a technology result table 63a specific for the impact that technology has on the active and reactive power requirements for the site.

The manner in which the technology result table 63a is generated is depicted in FIG. 7. As is shown, the apparent power (kVA) and power factor is then calculated for each time interval based on the equations as presented above.

In accordance with the present invention, rather than continuing to utilise the initial site energy usage data 54 imported in step 42 for assessing the impact of each technology on site energy consumption, the technology result table 63a generated from the impact of the previous technology then becomes the starting point for the next technology impact assessment, as is depicted in FIG. 8. The impact table data 60b for the next enabled technology is then assessed against the technology result table 63a for the previous technology to generate a new technology result table 63b for that technology. The apparent power (kVA) and power factor are calculated in the same manner as described above for the new technology result table 63b.

Figure 9:
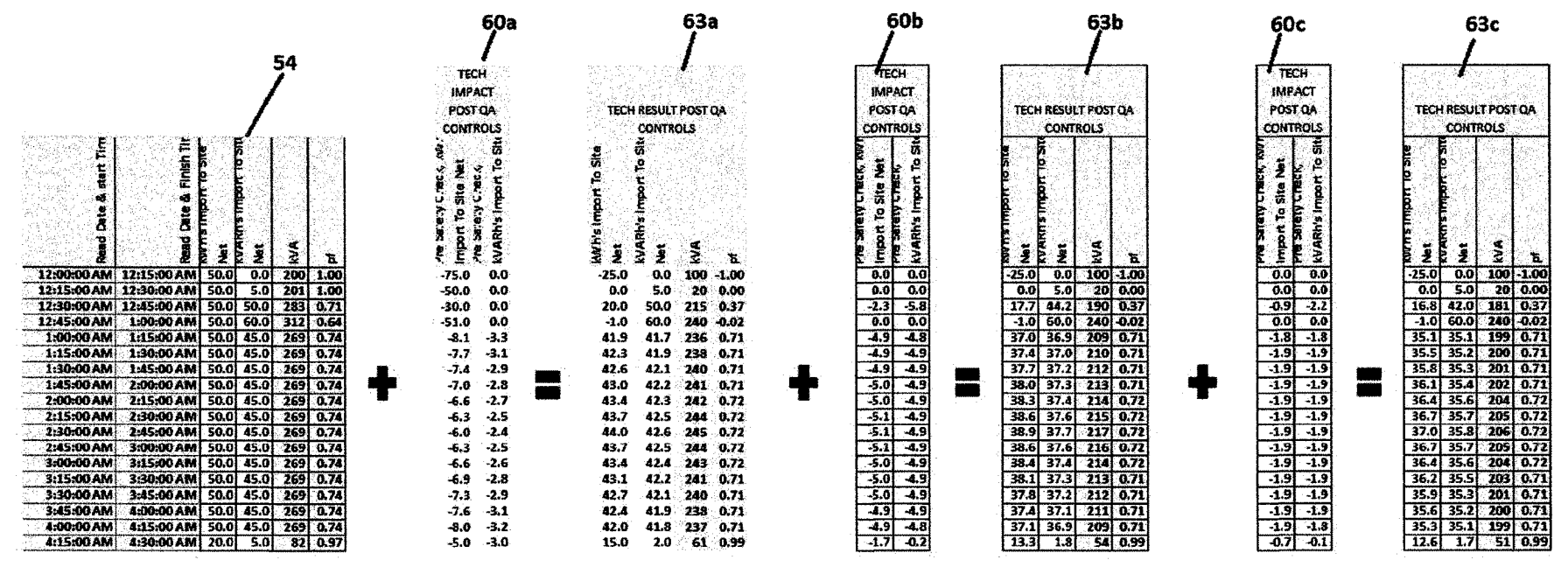

FIG. 9 depicts an impact assessment with three enabled technologies, designated as a, b and c. As can be noted, the site energy usage data in table 54 is only used for assessment of the first technology, technology a. For each subsequent technology assessment, the technology result table 63 (63a, 63b, 63c) of the previously assessed technology is used as the input data. This linear or sequential assessment captures the inter-dependability of the technologies and generates data representative of real and reactive energy savings achievable by combining the technologies at a site.

In step 46, the technology impacted forecast data is generated to provide the user with data representative of the energy savings likely at the site in both real and reactive power terms. This is determined by summing each of the real (kWh) and reactive (kVARh) power data for each of the time intervals present in the final technology result table 63 (in the depicted embodiment this is technology result table 63) for the enabled technologies and comparing this data against a sum of the real (kWh) and reactive (kVARh) power data for each time interval of the site energy usage data table 54.

This data can be commonly used by a site manager or similar energy professional to be entered into a costing engine to provide an accurate bill saving assessment, broken into the relevant time intervals, that compares energy bills for a site 'before' adding new technologies and 'after' adding new technologies. This can be used in a variety of ways, typically to calculate the return on investment in such technologies when compared against the capital cost (or finance) required to obtain access to and implement the technologies.

In the embodiment as depicted, in FIGS. 4-9, the results for incorporating the three enabled technologies a, b and c can be summarised as follows:

|  | kWh's | kVARh's |
| --- | --- | --- |
| Site Before | 870.0 | 705.0 |
| Site After | 472.1 | 569.1 |
| Total Impact | −397.9 | −135.9 |
| Match Check | TRUE | TRUE |
| Reduction % | 46% | 19% |

This indicates a significant reduction in real power required for the site of 397.9 kWh's (46%) and a reduction in reactive power required for the site of 135.9 (19%) kVARh's.

It will be appreciated that the system of the present invention can process not only kW/kWh data but also processes and forecasts the reactive and demand based data also including kVA/kVAh, kVAR/kVARh and power factor for every time series data interval. This includes accounting for all power flows through each quadrant of the Power Quadrant i.e includes both capacitive and inductive consideration for inductive loads as well as the import and export of true power.

The present invention also leverages several safety checks for quality control of the forecast data using a combination of the following functions:

ensures that if a technology is not able to generate power there is never a situation whereby the impact it provides is putting the sites forecast power into an impossible 'power export' mode;

ensures that export limited technologies consider the synergistically augmented kVA resulting from the kW & pf/kVAR at every point in time in the connected data. The export controls leverage calculations specifically in quadrant 2 and 3 of the Power Quadrant;

ensures that any generator never generates more than its nameplate rating in kVA and kW; and ensures that any energy efficiency upgrade does not create a false situation whereby the energy use post upgrade is less than the energy required to operate the upgraded technology It will also be appreciated that the system of the present invention is able to be easily updated to add (or remove) technologies for inclusion as they become available (or irrelevant). Such a system enables users to enable/disable connected technologies as part of the forecasting assessment to ensure that they are only leveraging the present system for the technologies relevant to the specific needs of their site.

The system of the present invention is configured to operate within a multi-technology return on investment (ROI) proposal generating & optimisation tool/software. Such a system can be employed by a large variety of users including:

a) Energy services sales companies seeking to optimise single and multi-technology projects to sell to energy consumers. The present invention will enable such users the ability to create bigger project opportunities and optimise the ROIs to the customers need;

b) Enterprises that connect with their customers or customer's customers to help them identify what they can do to best reduce their energy bills to retain and reward loyal customers; and c) Energy consumers who are able to identify what different technologies can do for them and engage with the market to deliver accordingly.

By providing a system that is capable of assessing technologies impact on energy consumption, a variety of other possible user groups would also have an interest, including:

a) Government and or councils that may want to see how they can most efficiently reduce their (or others) carbon footprint; and b) Manufacturers or the educational sector who may want to check an inventive product or technology innovation before development to validate the customer value and in doing so, the market opportunity research and development investment in the technology could bring.

In accordance with a second aspect of the present invention, the system is also able to be used by energy brokers and the like to optimise tariffs and supply costs so as to not only reduce energy consumption, but to also to minimise energy supply costs to provide an amalgamated energy optimisation system.

There are a variety of tariffs and charges associated with energy supply, particularly in relation to peak energy usage and off-peak energy usage. It is well established that by implementing a technology to minimise energy consumption, the new consumption requirements may have an adverse effect on the types and costs of power supply tariffs that the user is able to access. For example, many energy consumers that seek to install solar energy systems at a site may find that their energy bills may increase due to the change in energy consumption brought about by the implementation of solar technology (or simply some tariffs are not available once you have solar installed). This can occur due to the user being charged under a "time of use" tariff rather than a flat rate tariff. As the solar energy solution reduces their daytime energy consumption due to the presence of sunlight during the day time, their morning and evening usage, where most energy is consumed in a household, will be charged at peak rates, which can be up to 30% more than off-peak rates. This can lead to the forecast benefit of the solar technology being inaccurate, despite the obvious change in energy consumption after the solar technology has been installed.

Typically, in order to optimise supply tariffs it is necessary to review energy suppliers to assess the different rates and tariffs applied to energy consumption. This is typically conducted on historical energy usage and provides no linkage as to how those rates/tariffs may be affected by utilisation of different technologies.

Figure 10:
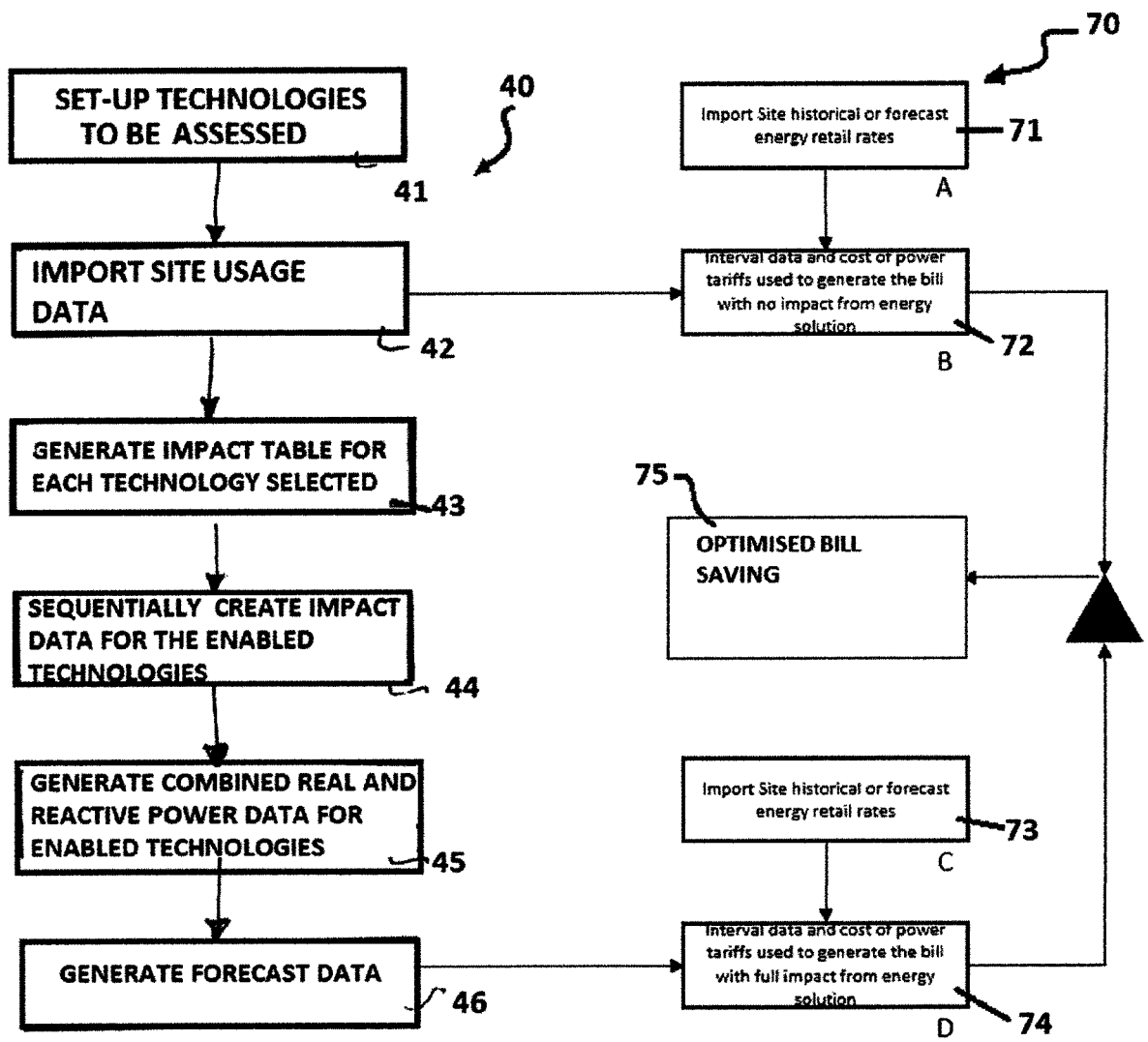
FIG. 10 a flow chart depicting a method for assessing the impact of energy solution technologies on the energy consumption at a site in accordance with another embodiment of the present invention.

The present invention addresses this problem utilising the method 70 as depicted in FIG. 10. The method 70 utilises the steps of method 40 as discussed above, and will use the same reference numerals to refer to the steps of method 40.

In steps 71 and 73, the system imports site energy tariff data 'A', 'C' associated with the energy supply for that site. The site energy tariff data generated in steps 71 and 73 may be taken from historical data taken from the site's energy suppliers that includes the tariffs applied at that site, such as off-peak and peak rates, demand charges, etc. Alternatively, the site energy tariff data may be generated or forecast based on other suppliers, resulting restrictions (i.e consumption is now below a threshold of certain tariff options that previously were an option) or desired rates as set by the site manager or similar individual responsible for such site issues. The energy tariff data A may be the same as the energy tariff data C or may be different, depending on the specific technologies selected or the energy suppliers used.

In step 72, an energy bill 13' is generated based on the site energy tariff data 'A' imported in step 71 when applied to the site usage data taken from Step 42 described above. This is generally done over each of the time intervals set for the determined usage duration. The energy bill B generated in step 72 is not impacted by the energy technologies being considered for implementation at the site by the user.

In step 74, the same process as above is employed to generate energy bill 'D' using the technology impacted forecast data generated in step 46 above and the site energy tariff data 'C' imported in step 73. This is generally done over each of the time intervals set for the determined usage duration. The energy bill 'D' generated in step 74 is impacted by the energy technologies being considered for implementation at the site by the user.

By using the technology impacted forecast data generated in step 46, it becomes possible to create an energy bill 'D' that depicts the 'real world' cost of power tariffs that are now applicable to the site due to the introduction of the new technologies. For example if the site is forecast to use less energy than a predetermined threshold energy level set by the energy supplier for that site, the site may no longer be able to access tariffs with a certain minimum threshold. Similarly, if the site is intending to implement solar technology, the site may no longer be able to make use of the tariffs they did before implementing such technology solutions.

In step 75, the generated energy bills 13' and 'D' taken from steps 72 and 74 can be compared to understand bill savings that do not just consider energy consumption changes created by introducing new energy technologies at the site, but also how these introduced technologies may affect the tariffs applied to the sites energy consumption.

It will be appreciated that such a method 70 provides additional information to the user when compared to method 40 by not just forecasting savings in energy consumption due to the introduction of new technologies at a site, but also how this may change supply tariffs at the site, which significantly influence the financial impact of such investments in new technologies. Such information can be used by site managers and the like to not only minimise energy consumption, but to also understand and plan for the true financial impact of such investments.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. A method of forecasting the combined impact the introduction of energy technology solutions will have on the energy consumption at a site, comprising:
selecting a plurality of energy technology solutions suitable for use at the site;

generating energy usage data for the site, the energy usage data comprising data usage for the site in predetermined time intervals over a predetermined duration;

creating energy impact data for each selected energy technology solution for each predetermined time interval based on the energy usage data for that time interval;

sequentially generating impacted energy data for each selected energy technology solution across each time interval, the impacted energy data generated for a preceding energy technology solution being used to generate the impacted energy data for a subsequent energy technology solution;

following completion of the sequentially generated impacted energy data for each energy technology solution, summing for each time interval independently the impacted energy data to generate a combined impacted energy data over the predetermined duration; and comparing the combined impacted energy data against the energy usage data for the site to determine a forecast combined impact the introduction of the selected energy technology solutions will have on the energy consumption at the site.

2. A method according to claim 1, wherein the plurality of energy technology solutions are selected from a table that lists each energy technology solution applicable for implementation at the site.

3. A method according to claim 2, wherein an energy technology solution may comprise a group of energy technology solutions that share electrical characteristics.

4. A method according to claim 1, wherein the energy technology solutions may be selected from the group of LED Lighting systems; Voltage Optimisation systems; Energy Monitoring systems; Power Factor Correction systems; Solar Power generators; Battery Energy Storage systems; Peak Lopping dispatchable generators; and HVAC upgrade systems.

5. A method according to claim 1, wherein the energy usage data for the site is generated from historical energy use for the site over the predetermined duration.

6. A method according to claim 1, wherein the energy usage data for the site is generated from projected energy usage data for the site.

7. A method according to claim 5, wherein the energy usage data for the site contains active or real power imported and/or exported into/from the site for the predetermined time intervals as well as reactive power imported and/or exported into/from the site for the predetermined time intervals.

8. A method according to claim 7, wherein an apparent power value and a power factor value can be determined from the active or real power data and the reactive power data.

9. A method according to claim 8, wherein the apparent power value and the power factor value are determined for each of the predetermined time intervals.

10. A method according to claim 1, wherein the energy impact data for each selected energy technology solution is created for each predetermined time interval in terms of real or active power and reactive power.

11. A method according to claim 10, wherein the energy impact data is generated in a table for each energy technology solution calculating an impact the energy technology solution will have on energy usage for each predetermined time period in terms of real or active power and reactive power.

12. A method according to claim 10, wherein the impacted energy data is sequentially generated for each selected energy technology solution by firstly generating impact table data for a first energy technology solution based on the site energy usage data to create the impacted energy data for the first energy technology solution and then using the impacted energy data for the first energy technology solution as a basis for generating an impacted energy data for a second energy technology solution.

13. A method according to claim 12, wherein an impact for each time period on the active power requirements and the reactive power requirements for each energy technology solution are added to the imported and/or exported active power data and reactive power data for that time period to generate a technology result table specific for the impact that technology has on the active and reactive power requirements for the site.

14. A method according to claim 13, wherein the technology result table generated from the impact of the previous energy technology solution is used as a starting point for generating a technology result table for a subsequent energy technology solution.

15. A method according to claim 13, wherein the combined impacted energy data over the predetermined duration is generated by summing each of the real and reactive power data generated for each of the time intervals present in the final technology result table for the last energy technology solution in the sequence.

16. A method according to claim 1, wherein the step of comparing the combined impact energy data against the energy usage data comprises creating a forecast energy bill for determining a cost saving in energy against a cost for implementing the energy technology solutions.

17. A method according to claim 16, wherein the forecast energy bill takes into consideration energy tariffs associated with implementing the selected energy technology solutions.

* * * * *